Patented Apr. 12, 1927.

1,624,575

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

ART OF GALVANOPLASTY.

No Drawing. Application filed July 3, 1926. Serial No. 120,530.

My invention relates to galvanoplasty, and particularly relates to the preparation of a composition containing a substance or substances ordinarily not soluble in water but soluble in organic solvents and an object of my invention is to employ an aqueous colloidal dispersion of the same and to render the surface of said materials electroconductive and capable of having electrodeposited thereon a permanent irremovable or a transitory removable layer of metal or other electrodeposited material, said deposited layer being permanent or transitory depending upon whether the final product is to be an encrusted object or a matrix of the surface upon which the electrodeposit is formed.

A further object of my invention is to provide an improved method of providing a flexible water-absorbent non-metallic object, such as a fibrous fabric of cotton, silk or paper, with a coating of metal, without destroying the flexibility of the object or subjecting the material of which the object is composed to the deleterious action of an electroplating bath.

A further object of my invention is to provide an improved method of surfacing a non-metallic water absorbent object with a waterproof coating of rubber in aqueous dispersion and to provide said coating with a layer of metal electrodeposited thereon.

A further object of my invention is to provide a plastic non-metallic colloidal substance in aqueous dispersion and which may be molded cold or worked upon the application of heat thereto into any desired shape and which is capable of receiving and retaining an imprint of a surface to be reproduced; to convert said colloidal substance into a water insoluble substance or material and to apply a layer of metal thereto by electrodeposition.

A further object of my invention is to provide a non-metallic substance normally insoluble in water but in aqueous dispersion, to coagulate said material and to render said substance or material electroconductive by incorporating therein, adding thereto or surfacing the same with comminuted metal or other electroconductive material, said electroconductive material being one which does not chemically react with the colloid, nor with any ingredients which may be added to or be contained in said colloid, nor with the electrolytic bath.

A further object of my invention is to provide an object which is to be subjected to a galvanoplastic process with a surface or coating of non-metallic colloidal material, to render said material impervious to water, to render the same electroconductive and to apply to said surface, by electrodeposition, a film, layer or coating of metal or other material capable of being electrodeposited.

A further object of my invention is to provide an anode for a galvanoplastic process comprising a non-metallic substance in aqueous dispersion and rendered electroconductive.

A further object of my invention is to provide an anode for an electrogalvanic process upon which rubber may be electrodeposited from an electrolytic bath.

A further object of my invention is to provide the surface or a portion of the surface of an anode of an electrolytic process with a film, coat or layer of irreversible colloid in aqueous dispersion, of which rubber latex is a type, coagulating said colloid to form a film, coat or layer insoluble in water, treating said film, coat or layer in a manner to make it electroconductive and depositing thereupon a material out of an electrolyte.

Further objects of my invention will appear in the specification and claims below.

My invention has to do particularly with those substances or materials which are ordinarily insoluble in water but which are capable of being dispersed in aqueous colloidal forms, and particularly relates to the various manipulations or treatments of the same to render them useful in the art of galvanoplasty. Such materials as to which my invention relates, are specifically the irreversible colloids, such as rubber, guttapercha, balata and various similar gums, lacs, resins and resinous gums, artificial resins, such as bakelite, nitrated cellulose products and the like, and in carrying out my invention, these materials are first used in a state of aqueous dispersion but in various states of fluidity, viscosity and plasticity, as may be found useful under various conditions, and one of the objects of my invention is to render such materials, whether in the form of a coating or a molded object, permanently water-resistant or insoluble in water, and to render said materials also electroconductive for the electrodeposition thereon of metal or other substances capable of electrodeposition as, for example, the deposition of pure rubber out of rubber latex.

In carrying out my invention, such substances as rubber latex, resins and other irreversible colloidal materials are used in a state of aqueous dispersion. Certain aqueous dispersions of them, however, occur in nature, in saps and in the latices of the various rubber-yielding plants. If these natural aqueous dispersions of irreversible colloids be used in carrying out my process, the step of dispersing the irreversible colloid in water is unnecessary. If, however, such saps or latices are not available, a synthetic latex may be obtained by dissolving rubber, gum, rosins and similar materials in an organic solvent, such as benzol, gasoline or carbon tetrachloride and dispersing the same into an aqueous colloidal form by agitation, mastication through rollers, or in any other well known manner, in the presence of and by the aid of water. In using chicle and similar substances, an aqueous dispersion may be effected by the aid of heat and agitation in the presence of water and/or steam with or without a supporting protecting aqueous colloid.

For the sake of making clear the relation of my invention to the art of galvanoplasty and the reasons for the various changes and modifications in the method of treatment, it should be noted that the art of galvanoplasty is divided into two general comprehensive classes, namely, permanent incrustation with a metal or other materials capable of electro-deposition out of an electrolyte, and reproduction or duplication. Incrustation with metal is perhaps the more simple process for, generally speaking, in both the class of incrustation and the class of reproduction or duplication, the step of incrustation is performed. In the class of incrustation, however, as I have applied it to the art of galvanoplasty, the electrodeposited coating is a permanent irremovable coating, while in the class of reproduction or duplication, the electro-deposit is a temporary coating which, after being formed, is stripped from the object so coated to form a negative or matrix of the contour or shape of the object on which the electrodeposit is formed. I will, therefore, first describe my invention as applied to the permanent incrustation or plating with metal or other substances by electro-deposition, the process being applicable to the providing of a piece of wood, a woven or knitted fabric or a sheet of paper or board or other non-metallic article with a permanent irremovable surfacing or coating of metal or other substance capable of being electro-deposited out of an electrolyte.

In carrying out such process, I may first apply to the object to be incrusted with metal a coating of an irreversible colloid in aqueous dispersion. This colloid may be rubber latex which is a natural aqueous dispersion of the rubber or it may be a synthetic or artificial latex made by first dissolving rubber in an organic solvent such as benzol and then making an aqueous dispersion of it by agitation or mastication. If the natural latex is too fluid, some of the water contained therein may be evaporated off to thicken it, but not enough water should be abstracted therefrom to cause a precipitation of the rubber contained therein. I may then allow the coating to dry, or partially dry, until it is tacky. The dehydration of the colloidal coating by mere evaporation will cause the colloid to revert or change or coagulate to form a water-insoluble composition which, in the case of rubber latex, will be pure rubber. The application of the colloid to the surface may be made in any well known manner, such as immersing, painting, spraying or dipping. While the colloidal surfacing is in a wet or damp condition, there may be applied to it in any convenient manner, a thin layer or coating of electroconductive material, such as graphite or comminuted metal, such as copper, bronze, silver or antimony. It would be advisable, however, not to apply this metallic coating until the colloid is nearly dry because the encasing or covering of the colloid with metal might seriously interfere with the complete drying of the colloid and the conversion of it into the insoluble precipitate. Or, if desired, the thin film or coating of the aqueous colloid may be allowed to perfectly dry after having been applied to the object, and when so dehydrated, the object will be covered with a thin water-repellant or waterproof coating of rubber. To this rubber film, however, comminuted metal or carbon might not adhere sufficiently well to form a true conductive coating over the surface thereof, and if such a rubber-coated object is to be provided with the conductive dusting or coating, I prefer to apply a second coating of the aqueous colloid thereto and to apply the electroconductive material to the second coating when it becomes tacky.

Having thus been provided with a metallic or electroconductive coat the object to be incrusted may then be placed in an electrolytic bath and a coating of metal or other material capable of being electro-deposited out of the electrolyte, may be deposited thereon. Thus, the non-metallic object may be provided with a metal incrustation of any desired thickness and of any desired metal.

Instead of precipitating the water-insoluble substance contained in the aqueous colloid by drying, I may coagulate it by dipping it into an acid bath or a bath of any other suitable coagulant, such as one of the alcohols, in which event I will provide the rubber film so formed with another coating of the aqueous dispersion and the second coating has attained a tacky consistency, provide it with the comminuted electroconductive material, after which metal may be deposited thereon in any suitable electrodepositing apparatus.

I prefer, however, to use a copper sulphate acid bath out of which to precipitate the metal onto the metal coated surface of the cathode and in some instances this acid electrolyte may be depended upon as the coagulating agent to precipitate the insoluble content out of the aqueous dispersion onto the object coated therewith at the very outset of the step of electrodeposition.

The above is perhaps the simplest application of my invention to incrustation but, in many instances, it is desirable to impart to the colloid a predetermined consistency before applying it to the object to be coated or protected thereby. Thus, I may add to the natural or artificial latex, materials which will increase the body or decrease the fluidity or render the colloid plastic and capable of receiving an impression, form or shape, which materials are preferably, in the main, those which may also be readily dispersed in colloidal form in water and not necessarily as irreversible colloids. These materials so added may and preferably do form a protective and supporting colloid for the irreversible colloid. Thus, in order to prevent the running or sagging of the powder on an object coated with the colloid in aqueous dispersion or to provide a coating having the thickness of, for instance, a coat of paint, I may add clay and/or zinc oxid and/or sodium silicate and/or casein and/or other proteinous, albuminous colloids to impart proper or desired consistency to the coat to be applied to the article to be incrusted. The following is given by way of example, of the manner of compounding and preparing a paint or coating of an aqueous colloid in carrying out my invention. I may take rubber latex (approximately 35% rubber), 100 parts by weight, to which I may add clay, 50 parts by weight, zinc oxid 100 parts by weight, water 30 parts by weight. The clay is preferably in an alkaline condition so as to prevent the too early or rapid precipitation of the rubber and to render such clay alkaline I may add thereto a small quantity of ammonium borax or lime. I preferably mix the clay with a small amount of such an alkali and the zinc oxid with water to form a paste and then add the paste to the latex. The above mixture is then applied to the object to be incrusted, by any suitable means, as by a brush, spray, knife or roller or by immersing, according to the shape or contour of the object being treated. The coating thus applied may be dehydrated by drying or heating in any suitable way in order to evaporate most of the water in the colloid before the application of the metallic or other conductive powder thereto. The powder is preferably applied to the surface of the coating while it is sticky or tacky, but after a substantial part of the water has been allowed to evaporate. I may coagulate the colloid by immersing the coated article in a weak acid or alcoholic bath in which case the insoluble coating thus formed must be provided with an adhesive coating, preferably a second coat of rubber latex to which the conductive powder will readily attach by dusting or spraying.

If it is desired to provide the article to be incrusted with a coating of vulcanized rubber, I may add to the latex or to the latex containing other ingredients, a proper amount of sulphur or other vulcanizing agent, in which case, after the dehydration or coagulation of the coating on the object, as above described, the object will be coated with a mixture of rubber and sulphur which can be formed into vulcanized rubber in any manner, well known to the art, as by heating the coating to a vulcanizing temperature. But in such a case, it will probably be necessary to give the vulcanized rubber an additional coating of the aqueous colloid or some other suitable adhesive to cause the conductive powder to adhere to the surface of the vulcanized rubber.

In some instances I may add the conductive material directly to the aqueous colloidal mixture before it is applied to the object in which case the conductive material will be dispersed uniformly throughout the colloidal coating to render it conductive. But great care should be taken to select a conductive material which does not react with the ingredients contained in the aqueous colloid or with the electroplating bath. Thus, it would be inadvisable to mix with a rubber colloid in aqueous dispersion and containing sulphur, a bronze powder as the electroconductive material, for the bronze powder and the sulphur would probably react with each other to form a substance which would greatly decrease the electroconductivity of the coating. Thus, when sulphur is contained in the colloid in aqueous dispersion for the purpose of vulcanization, it would be better to use powdered graphite or powdered antimony as the conductive material. The process above described is particularly applicable to the rendering of non-metallic material, such as wood, paper, woven or knitted fabrics and similar materials, capable of receiving an outer coating of electrodeposited metal. By the practice of this process, cloth may be given a thin surfacing of gold or bronze which will take upon itself the texture of the fabric on which the metal is deposited by electrodeposition. The resulting metallic cloth will have great flexibility. By reason of the thin film of rubber on which the metal is deposited the flexibility of a cloth fabric will not be substantially impaired. It may be bent almost as readily as the original fabric. Moreover, by providing such a water-absorbent material as woven or knitted cloth with a coating which is substantially waterproof prior to its immersion in the electrolyte, the material will not be affected or deteriorated by the electrolyte which will be prevented from actually coming in contact with the original material of the fabric, for the liquid of the bath cannot pass through the waterproof coating so applied to the object or article. To the irreversible colloid in aqueous dispersion, I may add materials, known as reversible colloids, such as casein, starch or clay in which event the coagulation or precipitation of both the irreversible colloid and the reversible colloid may be effected in the same way by heat or other means of dehydration; that is to say, by drying or by immersing the article coated therewith in a bath of an alcohol or a weak acid. The weak acid bath forming the electrolyte may, in some instances, be used to precipitate both the irreversible and reversible colloid.

By varying the amounts of the ingredients added to the irreversible colloid in aqueous dispersion, exemplified in latex (natural or artificial), I may vary the time in which the coating applied to the object is converted into an insoluble precipitate. Or I may add accelerating or retarding substance or materials, well known in the art, to hasten or to retard the time within which the colloid will coagulate or set. The dehydration of the colloid is also affected by the temperature to which it is subjected. Hence by varying the temperature the time of setting may be varied. The excess coating material may be removed from the coated article after taking it from the bath, drying in a centrifugal machine.

As an instance of the electrodeposition of a nonmetallic substance out of an electrolyte, I may deposit upon a suitably prepared anode of an electroplating apparatus, pure rubber out of rubber latex. To effect this, the anode should be one which is porous to permit of the circulation or permeation therethrough of the electrolyte which forms the conductor from one pole of the apparatus to the other. In carrying out this phase of the practice of my invention, I may apply to a suitable electric conductor, a coating or plastic mass of an irreversible colloid in aqueous dispersion and containing bicarbonate of soda or ammonium carbonate or any other gas producing or yielding material, and the gas liberated from such ingredients will render the colloidal coating porous. Upon an anode, so made, pure rubber may be readily electrodeposited out of an electrolyte composed of rubber latex.

In the class of duplication or reproduction in the art of galvanoplasty, my invention may be practiced by adding to an irreversible colloid in aqueous dispersion, such as rubber latex, other substances such as casein, china clay, zinc oxide, silicate of soda and other substances capable of being dispersed in colloidal form in water, together with earthy and/or other neutral fillers to produce a plastic mass having the desired degree of plasticity. For fillers I may use clay, wood, pulp, fiber, pulverized cork, pulverized asbestos or other substantially inert materials in quantities sufficient to produce the desired degree of plasticity. The plastic material so obtained may then be molded to any desired shape or spread out in any desired form to receive impressions as, for instance, the impressions from set-up type. After having been shaped or impressed the molded or imprinted material may then be converted into an insoluble material by dehydration or coagulation in any suitable way such as by drying it or by dipping it in a water-absorbent bath. If the surface, which it is desired to duplicate in metal, is given a dusting of comminuted electro-conductive material, or if the object be a molded object, the molding surface of the mold may be given a dusting of electro-conductive material, such as graphite or comminuted metal and this powdered material will become embedded in the surface of the plastic material being shaped, impressed or molded, will serve to separate the plastic material from the surface being duplicated and will provide a metallic surface for the matrix upon which an electro-deposit may be formed electrolytically. If the impression or molding is performed on the plastic material without applying the powdered material to the mold, then the surface of the die or mold is preferably given a thin film of oil or similar material so that the molded material may be readily separated from the mold or the imprinted material may be readily separated from the die or stamp.

After the impression has been made in the plastic material or the plastic material has thus been molded as desired, the plastic material is allowed to set or the plastic material is dehydrated and the normally water-resisting substances in the dispersion are precipitated in a substantially insoluble form or condition. Such a matrix or molded object may be incrusted with a permanent incrustation of metal deposited out of an electrolyte in an ordinary well known manner, or an electro, shell or matrix, a duplicate of the original surface or mold, may be formed in metal by the well known step of electroplating. The molded object or the matrix made out of a water-insoluble substance precipitated out of an aqueous colloidal dispersion undergoes very little shrinkage during the step of dehydration or coagulation so that it is particularly suited for use in making exact duplicates of a given object or surface. Moreover, the object or matrix thus formed will contain a considerably higher percentage of rubber than that obtainable from a mixture in which the rubber or insoluble material is merely dissolved in an organic solvent. In making the aqueous dispersion of the colloid, a relatively small amount of water may be caused to replace a much larger quantity of the colloidal solvent so that the aqueous dispersion is much richer in rubber or other material insoluble in water than is the organic solvent. Moreover, the hazard due to the high inflammability of the organic solvent is removed from the molding or duplicating or incrustation process by the use of the aqueous dispersion of the colloid in lieu of the solution of the material in the organic solvent as heretofore used in the arts. As an instance of the making of a plastic material to be molded or to receive an impression in the manner above described, the following mixture may be made:

| | Parts by weight. |
|---|---|
| Casein | 30 |
| Water | 100 |
| Borax | 2 |
| Ammonium | 5 |

These ingredients are thoroughly mixed together and when the solids have become dissolved in the liquid (water), I may add:

| | Parts by weight. |
|---|---|
| China clay | 10 |
| Zinc oxid | 10 |
| Water | 10 |

When these have been thoroughly mixed, I may add thereto rubber in aqueous suspension or an equivalent colloid containing preferably 35% by weight solid matter, 250 parts by weight and then I may add thereto comminuted and/or resilient filler substances, such as fiber, paper pulp, leather, cork, sawdust, powdered rubber and the like, until the desired degree of plasticity is obtained. If the surface of the object molded out of the above materials is not sufficiently tacky to make the conducting powder adhere thereto, a coat of natural or synthetic rubber latex of the desired consistency or a mixture of latex in aqueous dispersion with other ingredients or colloids may be applied to the molded or impressed article (the matrix) and then the conducting powder may be brushed or blown on the molded or impressed or imprinted surface when it becomes sufficiently tacky to retain the powder as a coating or layer. The electric current used in connection with these compositions is preferably a current of low voltage and low amperage and the time within which the electrodeposit of metal may be made thereon may vary from a few minutes to several hours. By the practice of my invention objects of many materials may then be treated for galvanoplastic reproduction or incrustation. Such objects may be of wood, glass, paper, or fiber, in the form of etchings, leaves, felt, ribbons or many other articles. If some of the substances dispersed in aqueous form, such as rubber, resins, or the like substance, be not sufficiently flexible when dehydrated, softening oils and/or combinations of oils, and/or waxes and/or resins may be also dispersed in aqueous colloidal form and mixed with the irreversible colloid forming the principal ingredient of the liquid or plastic or coating or moldable product.

When non-metallic substances are to be electrolytically deposited, such as the depositing of rubber out of rubber latex, the anode made of materials as herein disclosed, need not be provided with an electro-conductive surface. Anodes for this purpose are preferably non-metallic and of a porous nature. When a porous anode made from an aqueous dispersion of rubber, includes a substance or substances containing or yielding gases, such as ammonium carbonate or sodium bicarbonate, the gases may be liberated by heating the mixture. The electrolyte in such cases is the medium which conducts the current to the positive pole of the electrolytic cell through the pores of the porous anode and thus becomes the medium by means of which the anode is rendered electro-conductive.

Having thus described my invention, what I claim and desire to protect by Letters Patent of the United States is:

1. The method of electrodepositing metal on an object composed of water-absorbent non-metallic material which is not a conductor of electricity, which consists in providing said object with a coating comprising rubber in aqueous dispersion, rendering said coating electro-conductive, changing said coating into a water resistant coating by the abstraction of water from said aqueous dispersion and electro-depositing a layer of metal thereon.

2. The method of electro-depositing material upon a non-metallic body out of an electrolyte which consists in coating said body with rubber in aqueous dispersion, surfacing said coating with an electro-conductive comminuted material, coagulating the solid content of said aqueous dispersion to form a water resistant coating, and forming an electro-deposit thereon in an electro-plating bath.

3. The method of electro-depositing a flexible metallic surfacing on a flexible water-absorbent body of non-metallic material, which consists in surfacing said body with a coating of rubber in aqueous dispersion, rendering the surface of said coating electro-conductive by securing thereto a film of comminuted electro-conductive material, dehydrating said colloidal coating to convert said solid content of said aqueous dispersion into said water insoluble substance, and electro-depositing metal thereon by an electroplating process.

4. The method of electro-depositing a non-metallic material capable of electro-deposition out of an electrolyte containing said material in aqueous dispersion, which consists in providing an anode with rubber in aqueous dispersion, rendering said rubber electro-conductive, converting said colloid into a water-resistant coating and electro-depositing out of said electrolyte the electro-depositable material therein.

5. The method of electro-depositing a removable layer of metal on a non-conductive body, which consists in shaping a composition containing rubber in aqueous dispersion, coagulating said aqueous dispersion to render said rubber irreversible in water, rendering said rubber electro-conductive, providing the surface of said rubber with a separating film, depositing a metal out of an electrolyte on said surface and removing the electro-deposited metal from said electro-conductive surface.

6. The method of electro-coating with metal a normally water-absorbent material which is a non-conductor of electricity and without subjecting said material to the chemical action of the electrolyte, which consists in coating the surface of said material with rubber in aqueous dispersion, drying said coating until the surface thereof is tacky, covering said tacky and water-resistant surface with comminuted electro-conductive material and electro-depositing on said conductive surface a layer of metal.

7. The method of electro-coating with metal a normally water-absorbent body, which is a non-conductor of electricity without bringing said material into physical contact with said electrolyte, which consists in covering the surface of said material with a coating of a composition containing colloids in aqueous dispersion, one of said colloids being rubber latex, dehydrating the coating so formed until it is water-resistant and tacky, applying a surfacing of electro-conductive material to said coating, and electro-depositing a metal thereon in an electrolyte.

8. The method of electroplating with metal a non-conductive body which consists in coating said body with a composition containing colloidal rubber in aqueous dispersion and sulphur, partially dehydrating said coating to render the surface tacky, covering said coating with a conductive powder which does not chemically react with the sulphur when heated to temperatures employed in vulcanizing processes and heating said coating to a vulcanizing temperature to change said coating to insoluble vulcanized rubber.

9. The method of electro-coating with metal a water-absorbent material which of itself is a non-conductor of electricity and without bringing said material into physical contact with the electrolytic bath which consists in covering the surface of said material with a thin coating containing colloidal rubber in aqueous dispersion, partially dehydrating said coating to render the surface tacky and waterproof, covering said tacky surface with comminuted electro-conductive material, and subjecting said coating to a vulcanizing agent to change said rubber into vulcanized rubber.

10. The method of electro-coating with metal a non-absorbent material which of itself is a non-conductor of electricity without bringing said material into physical contact with the electrolytic bath, which consists in covering the surface of said material with a thin coating containing a rubber latex and sulphur, applying to the surface of the coating an electro-conductive powder which does not chemically react with the said sulphur and heating said coating to a vulcanizing temperature to change said coating into insoluble vulcanized rubber.

11. The method of electro-coating with metal a non-absorbent material which of itself is a non-conductor of electricity without bringing said material into physical contact with the electrolytic bath, which consists in covering the surface of said material with a thin coating containing a rubber latex, applying to the surface of the coating an electro-conductive powder, vulcanizing said rubber with an agent that does not chemically react with said powder at temperatures employed in vulcanizing processes and converting said colloid into a water insoluble composition.

12. The method of electrolytically depositing a substance out of an electrolyte which consists in providing an electrolytic cell with a pole comprising a base having a coating of rubber latex rendered electro-conductive, drying said coating to remove water from said latex to coagulate the rubber content thereof, placing said pole in said electrolytic cell and depositing thereon by electrolysis the solid depositable material contained by said electrolyte.

13. The method of electro-coating with metal a normally water-absorbent material which is a non-conductor of electricity, which consists in covering the surface of said material with a coating of a composition containing a plurality of irreversible colloids rendered electro-conductive, one of said colloids being rubber latex, removing water from the coating so applied sufficient to render said coating immobile when immersed in an electrolyte, and then electro-depositing metal thereon in an electrolytic bath.

In witness whereof, I have hereunto set my hand this second day of July, 1926.

ARTHUR BIDDLE.